Patented Oct. 21, 1941

2,259,723

UNITED STATES PATENT OFFICE 2,259,723

ALKYLATION PROCESS

Seaver A. Ballard and John Anderson, Berkeley, Calif., assignors to Shell Development Company, San Francisco, Calif., a corporation of Delaware No Drawing. Application March 1, 1940, Serial No. 321,803

11 Claims. (Cl. 196—10)

This invention relates to the alkylation of organic compounds by reaction with olefines or sulfate esters in the presence of inorganic acids of sulfur capable of catalyzing such alkylation. The invention is more particularly directed to the use of novel alkylation catalyst mixtures in such reactions.

An important object of the invention is to increase the effective life of inorganic sulfur acid alkylation catalysts such as sulfuric, chlorsulfonic, fluorsulfonic and like acids. Another object is to reduce the cost of alkylating organic compounds by reducing the catalyst consumption and increasing the efficiency of the reaction. Although the invention is not limited thereto it is particularly applicable to the production of motor fuels and a special object is to produce hydrocarbons of high antiknock value and to obtain high yields of highly branched chain paraffins boiling in the gasoline range from isoparaffins and olefines. Still other objects and advantages of the invention will be apparent from the following description.

The alkylation of aromatic and analogous heterocyclic compounds by olefines and alkyl sulfates using sulfuric acid as the alkylation catalyst has long been known. A particularly advantageous method of producing alkylated phenolic bodies is described, for example, in United States Patent 2,051,473. The alkylation of isoparaffins in the presence of sulfuric acid is a more recent development which is claimed in copending applications Serial No. 150,544, filed June 26, 1937, Serial No. 276,062, filed May 27, 1939 and Serial No. 305,498, filed November 21, 1939. Other alkylation processes using sulfuric acid as the catalyst are described, for example, in United States Patents 2,001,909 and 2,006,695.

While such alkylations are known to be essentially catalytic reactions, the sulphuric acid catalysts have been found in practice to lose their effectiveness in promoting alkylation after relatively short periods of use. The regeneration of such spent sulfuric acid requires dilution, decomposition of absorbed impurities, and reconcentration and involves losses of acid and operating expenses which make regenerated acid very costly. Such regeneration is consequently to be avoided as much as possible. This is made possible by the process of the invention which greatly extends the time which sulfur acid alkylation catalysts may be used without losing their effectiveness.

The cause of the loss of effectiveness of alkylation catalysts such as sulfuric acid is not fully known and probably varies with the nature of the materials used and the conditions of alkylation employed. Thus, for example, in alkylating isoparaffins such as isobutane and isopentane the consumption of sulfuric acid is much greater under optimum alkylating conditions when propylene is used as the alkylating agent than when beta-butylene is employed. In fact the sulfuric acid requirements for alkylating isoparaffins with propylene have heretofore been so great as to limit commercial application of the reaction. The application of the process of the invention to this reaction will therefore be emphasized in the following discussion because of its commercial importance. It is to be understood, however, that the invention is not limited to this illustrative example but that similar advantages and improvements may be obtained in other alkylation reactions carried out with olefines and/or alkyl sulfates in the presence of sulfuric and halo-sulfonic acids or mixtures thereof. The high cost, short life and difficulty of regenerating halo-sulfonic acid alkylation catalysts such as chlor- and fluorsulfonic acids makes the present process particularly valuable where alkylation with such catalysts is used. Typical of other alkylation reactions in which the process of the invention gives improved results are the alkylation of benzene, toluene, naphthalene, phenol, cresols and naphthol.

In accordance with the invention many of the disadvantages of the former sulfuric acid alkylation processes are successfully overcome by substituting for concentrated sulfuric, chlorsulfonic and fluorsulfonic acids a novel alkylation catalyst, namely, a mixture of such acid with a hydrogen halide. From an economic standpoint there are advantages in using mixtures of concentrated sulfuric acid and hydrogen chloride because of the low cost of these acids but mixtures of sulfuric acid with hydrogen bromide or of chlorsulfonic or fluorsulfonic acids with either hydrogen chloride or bromide may also be used. By the use of these acid mixtures the consumption of catalyst may be reduced to one-half to one-third, or even less, of the quantity of acid formerly required.

Alkylation with mixtures of sulfur acid alkylation catalysts and hydrogen halides may be carried out under the same reaction conditions found suitable with the corresponding sulfur acid alone. Thus, for example, in alkylating isoparaffins such as isobutane and isopentane with olefines temperatures between about 0° and 50° C. may be used with mixtures of sulfuric acid of about 90% to 110% concentration (on a hydrocarbon free basis) and hydrochloric acid while lower temperatures of the order of about −60° to about 20° C. are preferable with similar mixtures in which chlorsulfonic acid is used in place of sulfuric acid. The preferred range of temperatures for fluorsulfonic acid hydrochloric acid mixtures is between about −40° and 25° C. although higher temperatures, for example up to about 100° C. may be used.

For the preparation of mono-alkyl derivatives it is desirable to employ at least a small molecular excess of the compound being alkylated compared with the amount of olefine used. Where isoparaffins are being alkylated it is advantageous to use a substantial excess of isoparaffin to olefine. With sulfuric acid catalysts ratios of at least 3 mols of isoparaffin to one of olefine in the feed are desirable while ratios of up to 5 or 6 to 1 are preferred and best results are usually obtained by carrying out the alkylation under conditions such that ratios of 10 to 30 mols or more of isoparaffin per mol of olefine are present in the reaction mixture. While it is also advantageous to employ an excess of isoparaffin to olefine, preferably at least two mols of isoparaffin per mol of olefine, when using the halogen acid containing alkylation acid mixtures of the invention, it is possible to employ lower ratios than have been found necessary for the best results with sulfuric acid alone. This is of practical advantage because it reduces the cost of supervision required in former procedures where rigid control of the reaction is necessary in order to maintain the ratio of isoparaffin to olefine constant in spite of fluctuations in the composition of the feed. It has the further advantage of making possible a reduction in the amount of unreacted isoparaffin which must be recovered from the alkylation product and recycled to the reaction, an operation usually requiring redistillation to separate undesirable diluents such as the corresponding normal paraffin.

The process may be carried out with the reactants in the gaseous state but more preferably reaction under conditions at which at least the compound being alkylated is in the liquid phase are used and most preferably reaction conditions which insure the presence of all reactants at least partially in the liquid phase are employed. To the latter end it is usually advantageous to operate under superatmospheric pressure when using low boiling reactants. In liquid phase operation it is usually desirable to employ a volume of catalyst phase at least equal to about 20%, and more preferably about 40% to about 150%, of the volume of hydrocarbons used.

While quite short contact times of the order of one-half to five minutes may be used particularly where reaction in the gas phase is being carried out, contact times of hydrocarbon with sulfuric acid-hydrochloric acid mixtures of the order of 15 to 60 minutes or more such as are more conveniently achieved by liquid phase operation are preferred for the alkylation of isoparaffins with olefines or alkyl sulfates. The best reaction time to use in any given case will depend upon the compound being alkylated, the alkylation agent used, the particular combination of sulfur acid alkylation catalyst and hydrogen halide chosen and the reaction conditions employed.

Batch, intermittent or continuous methods of operation may be used. Different procedures which may vary with the method of operation chosen, may be used for insuring the presence of the desired hydrogen halide in the reaction mixture. Thus hydrogen chloride, preferably anhydrous, may be added with the hydrocarbon feed to the reactor to compensate for that withdrawn with the product or liquid hydrogen chloride either anhydrous or dissolved in water or other suitable solvent may be added to catalyst acid directly, care being taken of course, to avoid dilution of the sulfuric or like acid to concentrations below those suitable for the desired alkylation.

One simple method of carrying out the process of the invention is to bubble isoparaffin and olefine containing gases saturated with hydrogen chloride through a preferably mechanically agitated body of sulfuric acid alkylation catalyst. Jets or other distributing means may be employed to inject the liquid and/or gaseous hydrocarbons and thus provide the desired agitation. Towers, provided with trays or perforated plates or packing material over which the mixture of sulfuric and hydrochloric or like acids and hydrocarbon is allowed to flow, may also be used. In some cases it may be desirable to have counter-current flow between a mixture of the compound being alkylated in the liquid phase and sulfuric acid for example on the one hand and the olefine in the gaseous state and hydrogen chloride on the other. Most preferably, however, olefines are reacted with isoparaffins by feeding the olefine or the corresponding dialkyl sulfates or suitable absorption products of olefines in sulfuric acid of alkylation strength and hydrogen chloride or the like, preferably with a molecular excess of the isoparaffin based on the olefine, into a circulating mass of reacted mixture comprising dispersed sulfuric acid whereby the reaction is effected with a higher ratio of isoparaffin to olefine than is present in the feed as described and claimed in copending application Serial No. 245,714, filed December 14, 1938.

The amount of hydrogen halide which may be used may vary widely. As little as 0.25% of hydrogen chloride based on the hydrocarbons used is effective in increasing the life of sulfuric acid used for alkylating isobutane with propylene. Amounts greatly in excess of a molecular equivalent based on the olefine and/or alkyl sulfate present are of no advantage. On the whole only relatively small amounts of hydrogen chloride, or other suitable hydrogen halide are required since there is no substantial loss in the process when care is taken to recover and recycle any halides which are withdrawn with the product. A part of the hydrogen halide may be present in the withdrawn reacted mixture as alkyl halides which are preferably returned to the reaction along with any free hydrogen halide present. In this way consumption of hydrogen halide is prevented since the accumulation of alkyl halides in the system is prevented either through reaction or the mass action effect of the recycled alkyl halides.

The following example shows the advantages of the invention and illustrates one suitable method of applying its principles.

*Example I*

Hydrogen chloride was blended with the feed to a continuous alkylation unit of the turbomixer type provided with a cooling coil and inlet lines for the hydrocarbon reactants and returned acid catalyst and a draw-off line leading to a stratifier from which upper hydrocarbon phase was continuously removed while the lower acid phase was taken off by the acid return line. The reactants were fed in under a pressure of about 250 to 300 lbs./sq. in. and hydrocarbon phase was withdrawn from the separator at the same rate. The withdrawn hydrocarbon phase was distilled to separate alkylation products from the hydrogen chloride, unreacted hydrocarbons and chlorinated hydrocarbons present therewith and the various products were measured and analyzed. In starting up 98% sulfuric acid mixed with isobutane was charged to the reactor before the feed was admitted. The operating conditions and results were as follows:

Composition of the feed (wt. per cent):

| | Per cent |
|---|---|
| Propylene | 7.0 |
| Propane | 18.3 |
| n-Butane | 3.9 |
| Isobutane | 70.2 |
| Hydrogen chloride | 0.6 |

Feed rate 1.55–1.81 volumes/hour/volume of reaction space.

Average contact time of hydrocarbon with acid—20 min.

Mol ratio of isobutane to olefine in feed—7.3 to 1

Volume ratio of acid to hydrocarbon—0.7 to 1

Reaction temperature, 30° C.

Weight per cent of product based on olefine feed—163.

Composition of product after production of 2.88 volumes per volume of acid:

| Boiling range of fraction | Weight percent of product | Bromine number | Chlorine |
|---|---|---|---|
| ° C. | | | Percent |
| 23– 45 | 12.9 | 0.0 | 37.6 |
| 45– 95 | 70.0 | 0.0 | 9.7 |
| 95–150 | 10.6 | 0.2 | 0.5 |
| abv. 150 | 6.5 | 1.9 | 0.0 |

Octane rating of fraction boiling 45–150° C.—89.0.
Volumes of product per volume of acid used—6.32.

By returning the fraction boiling between 23° and 45° C., consisting substantially of isopropyl chloride, to the reactor the yield of substantially chlorine free alkylation products boiling between 45° and 150° C. could be raised to about 175%. In a run carried out under exactly the same conditions except that no hydrogen chloride was used the yield (weight percent of products boiling above 23° C., based on the propylene fed) was only 144% and only 5.46 volumes were obtained per volume of acid used.

Improved acid life also is obtained when other olefines are used in place of propylene as above-described, particularly normal and isobutylenes, trimethyl ethylene and isomeric amylenes, and cyclohexene. The process may also be employed with other olefines such as the higher normally liquid olefines of cracked gasoline or fractions thereof. Instead of the olefines their polymerization products such as di- and tri-isobutylenes, the interpolymers of different olefines such as are described in United States Patents 2,174,247 and 2,181,640 and the like may be used. Particularly suitable feed stock for the process is the residual hydrocarbon obtained in the process of the latter patent. Such hydrocarbon may be used with or without separation of the polymers formed in the process. Instead of olefines alkyl sulfates such as may be obtained by treatment of olefines or alcohols with sulfuric acid may be used. Thus mono- and/or di-ethyl, propyl, isopropyl, isobutyl and like sulfates may be used as the alkylating agent in accordance with the process of the invention.

Instead of using the process of the invention as a substitute for prior sulfuric acid and like alkylation processes, it may be used in conjunction therewith. Thus, for example, sulfuric acid which has been used in such an alkylation process may be continuously or intermittently conducted to another reaction stage in which it is contacted with a mixture of isoparaffin and hydrogen chloride whereby alkylation of the isoparaffin by alkyl esters present in the acid is effected and the effectiveness of the acid as an alkylation catalyst is increased so that it may advantageously be returned to the first alkylation stage for the conversion of more isoparaffin and olefine. The effectiveness of such a method of treating alkylation acid is illustrated by the following example.

*Example II*

In the same apparatus used in Example I isobutane was reacted with propylene in the presence of sulfuric acid alone under the same conditions except that a temperature of 40° C. was used. The initial concentration of the acid was 98.1% but the acid phase withdrawn after the production of 4.25 volumes of products per volume of acid had a titratable acidity of only 58.2%. This acid was charged to a reaction mixer with an equal volume of isobutane. Anhydrous hydrogen chloride was added to raise the pressure to 100 lbs. The mixture was stirred for 3 hours at 20° C. while additional hydrogen chloride was added intermittently to maintain the pressure. By this procedure alkylation of the isobutane took place and the titratable acidity of the acid was increased to 79% $H_2SO_4$. An appreciable amount of isopropyl chloride was also formed. Return of this product to the reactor with or without separation of the unreacted isobutane could be used to increase the yield of alkylation products obtained. By returning the treated acid to the olefine reaction stage it could be again made to serve as an alkylation catalyst, although best results are obtained by using it in admixture with fresh acid.

In a similar test run on the alkylation of isobutane with a butane-butylene mixture containing beta-butylene as the principal olefine, obtained as unreacted hydrocarbon from the treatment of a $C_4$ fraction of cracked petroleum with hot sulfuric acid to polymerize iso- and secondary butylenes, the acidity of the alkylation acid was likewise materially increased and alkylation products were obtained. In this case some secondary butyl chloride was also formed.

It will be seen that the process of the invention offers many advantages particularly in increasing the effective life of sulfur acid alkylation catalysts. Even greater increases in the life of such catalysts may be obtained by combining the process of the invention with pretreatment of the feed to the alkylation unit to remove catalyst poisons as described and claimed in copending application Serial No. 281,882, filed June 29, 1939.

The invention offers special advantages in the treatment of petroleum fractions or products and is especially useful in the manufacture of premium motor fuels from petroleum cracking products. However, starting materials derived by dehydrogenation, for example, as described in United States Patents 2,182,431 and 2,184,235, and/or isomerization of paraffins as disclosed in French Patent 823,595, for example, may also be used. It will thus be clear that the process of the invention is capable of wide variation with respect to the materials which may be alkylated as well as the olefines and sulfate esters which may be used as alkylating agents. The operating procedure adopted may also be varied. Thus while the separation and return of hydrogen halide and alkyl halide to the alkylation process has been described in the illustrative examples, the actual segregation of these components of the reaction mixture is not necessary and mere separation of the desired reaction product, particularly when it is higher boiling than the alkyl halides formed, and return of all other components, i. e., unreacted alkylatable starting material, hydrogen halide and alkyl halide, with or without any diluents such as normal paraffins or hydrogen or other gases, to the alkylation may offer advantages. Also where desirable the alkyl halide may be recovered as a valuable by-product and only the unalkylated starting material recycled. In the two-stage alkylation process described, the entire reaction mixture from the reaction with used catalyst acid may be fed to the stage in which the olefine is being fed thus effecting both stages of the reaction in the presence of hydrogen halide which after separation from the final reaction product is returned, with or without unreacted isoparaffin or other alkylatable compounding being used, to both reactors or to only the used catalyst acid reactor. Alternatively alkylation products alone or together with any alkyl halides formed may be separated from the used catalyst acid reaction mixture prior to feeding remaining components to the other reaction stage. Also it may be desirable to operate the reaction stages under different conditions and particularly to carrying out the reaction with used catalyst at a higher temperature than is used in the stage where more active catalyst is employed in order to promote more vigorous reaction. Obviously, more than two reaction stages may be used and olefine or sulfate ester alkylating agent may be supplied to any or all of the stages, instead of to only one stage as described. As still other variations may be made in the process it will be understood that the invention is not limited to the details disclosed nor by any theory suggested in explanation of the improved results obtained but only by the accompanying claims.

We claim as our invention:

1. In a process for producing gasoline motor fuel from normally gaseous hydrocarbons, the step of reacting isobutane with a normally gaseous olefine of at least three carbon atoms per molecule in the presence of a catalyst consisting predominantly of a mixture of sulfuric and hydrochloric acids.

2. In a process for producing motor fuel from a normally gaseous olefine of at least three carbon atoms per molecule, the step of treating a liquid mixture comprising said olefine and a substantial molecular excess of isobutane with a mixture of sulfuric and hydrochloric acids in substantial proportions.

3. In the alkylation of isobutane with a normally gaseous olefine of at least three carbon atoms per molecule, the improvement which comprises reacting the isobutane with said olefine in the presence of a catalyst comprising a mixture of sulfuric acid with a hydrogen halide of the class consisting of hydrogen chloride and hydrogen bromide.

4. In a process for producing motor fuel from a hydrocarbon mixture containing an olefine and an isoparaffin by treatment with sulfuric acid under alkylating conditions, the improvement which comprises effecting said treatment in the presence of a substantial amount of hydrogen chloride.

5. A process for producing substantially saturated normally liquid hydrocarbons which comprises reacting a mixture consisting of at least one paraffinic hydrocarbon containing at least one tertiary carbon atom per molecule and an olefinic hydrocarbon at a temperature between $-20°$ and $+40°$ C. in the presence of a mixture of sulfuric and hydrochloric acids.

6. In the alkylation of an isoparaffin by reaction with an alkylating agent of the class consisting of olefines and alkyl sulfuric esters in the presence of sulfuric acid, the improvement which comprises adding hydrogen chloride to the feed prior to contacting it with the sulfuric acid.

7. In the alkylation of an aromatic compound by reaction with an alkylating agent of the class consisting of olefines and alkyl sulfuric esters in the presence of sulfuric acid, the improvement which comprises adding a hydrogen halide of the class consisting of hydrogen chloride and hydrogen bromide to the reaction mixture.

8. In a process for alkylating an organic compound in which a hydrogen atom can be substituted by an alkyl group by reaction with an alkylating agent of the class consisting of olefines and alkyl sulfate esters in the presence of sulfuric acid, the improvement which comprises contacting said reactants with said acid in the presence of a hydrogen halide of the class consisting of hydrogen chloride and hydrogen bromide.

9. In a process for alkylating an organic compound in which a hydrogen atom can be substituted by an alkyl group by reaction with an alkylating agent of the class consisting of olefines and alkyl sulfate esters in the presence of sulfuric acid, the improvement which comprises contacting said reactants with said acid in the presence of a hydrogen halide of the class consisting of hydrogen chloride and hydrogen bromide, substantially separating a halogen compound from the alkylation product and returning at least a part of said separated halogen compound to the reaction.

10. In a process for alkylating an organic compound in which a hydrogen atom can be substituted by an alkyl group by reaction with an alkylating agent of the class consisting of olefines and alkyl sulfate esters in the presence of sulfuric acid, the improvement which comprises contacting acid from said reaction which has lost at least a part of its capacity for catalyzing said reaction with said alkylatable organic compound in the presence of hydrogen chloride.

11. In a process for alkylating an organic compound in which a hydrogen atom can be substituted by an alkyl group by reaction in the presence of a sulfur acid alkylation catalyst with an alkylating agent of the class consisting of olefines and alkyl sulfate esters, the improvement which comprises contacting said reactants with said acid in the presence of a hydrogen halide of the class consisting of hydrogen chloride and hydrogen bromide.

SEAVER A. BALLARD.
JOHN ANDERSON.